United States Patent
Bungo et al.

(10) Patent No.: US 6,188,492 B1
(45) Date of Patent: Feb. 13, 2001

(54) IMAGE READING APPARATUS (75) Inventors: Keiichiro Bungo, Asaka; Toru Matsui, Nara, both of (JP)

(73) Assignee: Minolta Co., Ltd., Osaka (JP)

( * ) Notice: Under 35 U.S.C. 154(b), the term of this patent shall be extended for 0 days.

(21) Appl. No.: 08/998,154

(22) Filed: Dec. 24, 1997

(30) Foreign Application Priority Data

Jan. 6, 1997 (JP) .................................................. 9-000317

(51) Int. Cl.[7] ....................................................... H04N 1/04
(52) U.S. Cl. ........................... 358/486; 358/474; 358/497
(58) Field of Search .................... 358/486, 497, 358/494, 474, 471, 488, 401, 300, 475, 449, 452, 450, 447, 448; 250/208.1, 559.06, 559.08, 234, 235; 355/82, 25, 24; 399/362

(56) References Cited

U.S. PATENT DOCUMENTS

| | | | |
|---|---|---|---|
| 4,745,490 | * 5/1988 | Shimizu et al. | 358/300 |
| 5,084,611 | 1/1992 | Okisu et al. | 250/208.1 |
| 5,377,019 | 12/1994 | Okisu et al. | 358/464 |
| 5,416,609 | 5/1995 | Matsuda et al. | 358/474 |
| 5,463,697 | 10/1995 | Toda et al. | 382/199 |
| 5,479,262 | 12/1995 | Namiki et al. | 358/296 |
| 5,585,926 | 12/1996 | Fujii et al. | 358/471 |
| 5,610,720 | 3/1997 | Fujioka et al. | 358/296 |
| 5,616,914 | * 4/1997 | Matsuda et al. | 250/208.1 |
| 5,659,404 | * 8/1997 | Matsuda et al. | 358/474 |
| 5,677,776 | * 10/1997 | Matsuda et al. | 358/475 |
| 5,764,374 | * 6/1998 | Matsuda et al. | 358/474 |

FOREIGN PATENT DOCUMENTS

| | | |
|---|---|---|
| 60-254869 | 12/1985 | (JP) . |
| 62-014664 | 1/1987 | (JP) . |
| 63-102472 | 5/1988 | (JP) . |
| 63-249869 | 10/1988 | (JP) . |
| 1-218262 | 8/1989 | (JP) . |
| 2-087769 | 3/1990 | (JP) . |
| 3-079158 | 4/1991 | (JP) . |
| 5-336341 | 12/1993 | (JP) . |
| 6-046214 | 2/1994 | (JP) . |
| 6-205194 | 7/1994 | (JP) . |
| 6-326865 | 11/1994 | (JP) . |
| 7-079324 | 3/1995 | (JP) . |
| 7-234555 | 9/1995 | (JP) . |

\* cited by examiner

*Primary Examiner*—Cheukfan Lee
(74) *Attorney, Agent, or Firm*—Sidley & Austin (57) ABSTRACT

An image reading apparatus includes a linear sensor unit for reading the side shape of a document on a document platen and outputting the outcome of the reading as an image data and a detector for detecting a binder based on the presence of a space (a protrusion) in the image data inputted by the linear sensor unit. This apparatus infallibly judges that such an object as a binder, which is unnecessary for image reading, is present in the document.

23 Claims, 8 Drawing Sheets

IMAGE READING APPARATUS

BACKGROUND OF THE INVENTION

1. Field of the Invention

This invention relates to an image reading apparatus for reading, by means of optical scanning, a document placed on a document platen, and more particularly to an image reading apparatus which is capable of focussing a lens during the image capture by detecting the leaf face height.

2. Description of the Related Art

The image reading apparatus, which is designed to capture an image of a document so placed as to direct the leaf face upward, has been heretofore known to adopt the apparatus which scans the edge of the terminal end of a document, detects the difference in brightness between the back end and the background, thereby recognizes the shape of the relevant part of the document and detects the leaf face height (Japanese Published Unexamined Patent Application (A) 07-079324). According to this technique, a detector as an image sensor scans and reads the leaf face placed on a document platen and the terminal end of the document reflected by a mirror disposed aslant behind the rear side of the document platen at the same time. The apparatus, therefore, is enabled to determine the leaf face height by counting the number of picture elements of the image sensor corresponding to the edge of the terminal end of the document which has been read out. It is enabled to bring all the points of the leaf face into focus and obtain a perfect in focus image of the document.

Further, there is a known image reading apparatus (JP-A-60-254869), which is provided on the rear side of a document platen with a distance measuring plate as a stopper for positioning of a document and is so designed to press against the distance measuring plate the top end of a document (on the rear side) so placed as to direct the leaf face upwardly, capture the edge of the top end of the document, detect the difference in brightness between the leaf face and the distance measuring plate disposed on the background, and correct the read image, based on the difference of brightness. In this apparatus, the surface of the distance measuring plate forms a focus detecting surface with a reflectance different from that of the document platen and that of the document surface. When a given document is thick, as in the case of a book or a document, and the thickness varies in the lateral direction, part of the focus detecting surface is covered on account of the thickness of the document. As a consequence, there is a change in the length in the main-scanning direction (recessing direction) of the focus detecting surface which is discerned by an image sensor such as a linear CCD image sensor, for example. By discerning this length, the apparatus can detect the variation in the thickness of the document and focus a lens on the image.

The image reading apparatus as disclosed in Japanese Patent Application No. 05-169720, which is so designed to focus a lens on an image based on the height of the document detected by scanning the terminal end of the document, has a possibility that binding rings are mistaken for the leaf face when a given document having opposite faces bound with the binding rings is placed on the document platen. It is at a disadvantage when exposing the focus to deflection and inducing the phenomenon of blurring in the produced image.

Incidentally, such binders used for binding pages of the document produce shadows at the center of the leaf face. The shadows, therefore, create the problem of obscuring the image being read out.

SUMMARY OF THE INVENTION

The object of this invention is to obtain a perfect image without blurs by securing a highly accurate focus and also obtain an image of fine appearance by excluding such image data created by binders and shadows thereof, which are unnecessary for an image, as regards an image reading apparatus.

One aspect of this invention concerns an image reading apparatus which comprises a reading unit which reads a side shape of a document placed on a document platen and outputs a read image as image data and an unnecessary object detector which detects an unnecessary object based on the presence or absence of a space in the image data outputted by the reading unit.

When a document bound with binders, for example, is placed on a document platen as opened to reveal the leaf face and the side shape of the document is read out, a protrusion appears in the waveform in the output of the reading unit and gives rise to a space in the image data. The apparatus, therefore, can discern accurately the presence of such an unnecessary object for reading as binders in the document by detecting the presence of this space.

Another aspect of this invention concerns an image reading apparatus which comprises a reading unit which reads a surface of a document placed on a document platen and outputs a read image as image data, a detector which detects a height distribution of the document surface and a decision unit which decides that an unnecessary object for reading is present when data detected by the detector contains at least two inflection points.

In this apparatus, when a document bound with binders, for example, is placed on a document platen as opened to reveal the leaf face and the distribution of leaf face height is detected by the detector, the data obtained by this detection has at least two inflection points. Thus, it can be judged that the relevant document has binders when the data shows the presence of two or more inflection points. In other words, the apparatus can judge infallibly the presence of such an unnecessary object for reading as binders in the document by analyzing the detected data of the height distribution of the leaf face of the document.

Yet another aspect of this invention concerns an image reading apparatus for reading a document of a plurality of sheets bundled with binders passed through punched holes formed in the sheets, the apparatus comprising a reading unit which reads a surface of the document and outputs a read image as image data, a binder detector which detects positions of the binders in the document and an erasing unit which erases binder image data from the image data.

This apparatus is enabled to obtain an image of fine appearance by excluding the image data of the binders themselves, which are unnecessary for an image.

The objects, features, and characteristics of this invention in addition to those set forth above will become apparent from the description given herein below with reference to preferred embodiments illustrated in the accompanying drawings.

DETAILED DESCRIPTION OF THE PREFERRED EMBODIMENT

The embodiments of this invention will be described below with reference to the accompanying drawings.

First Embodiment

Figure 1:
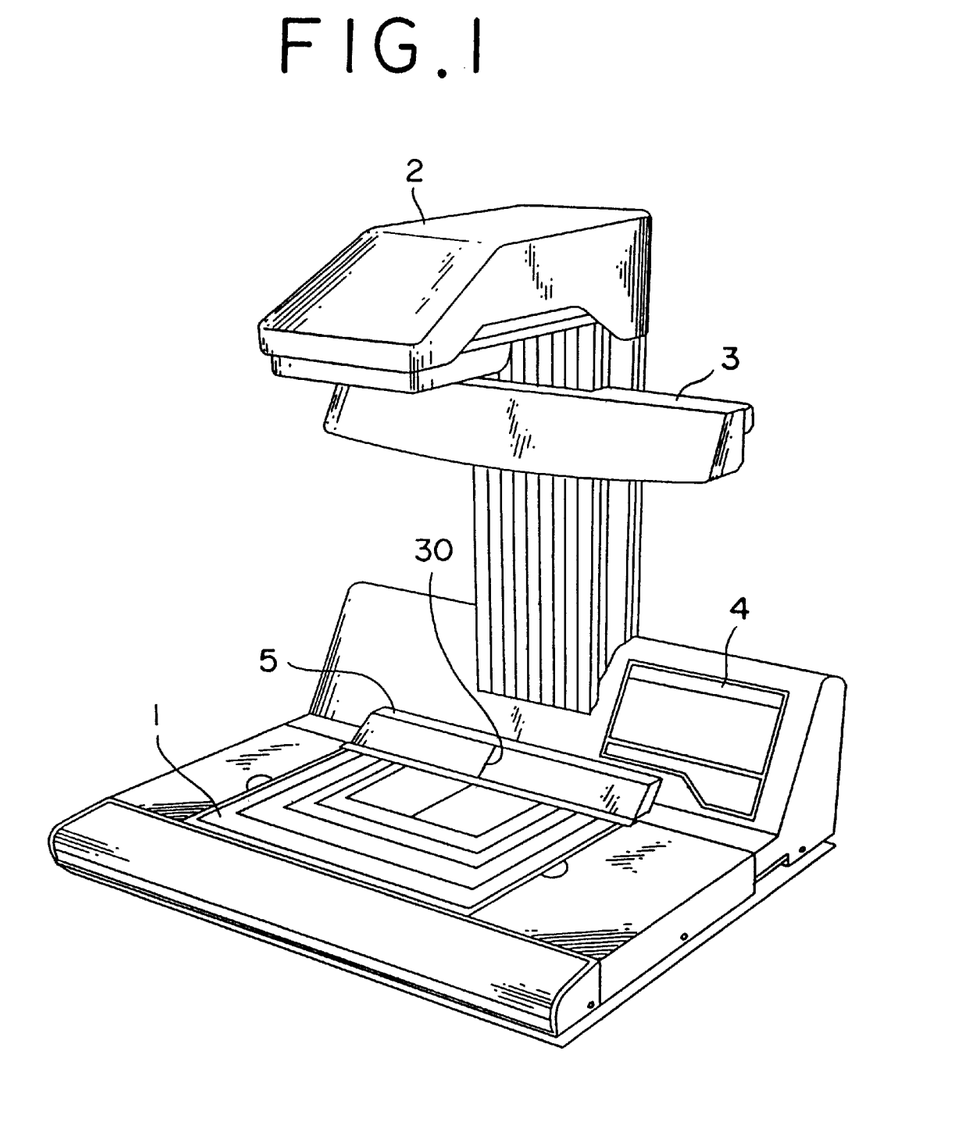
FIG. 1 is a perspective view illustrating the overall construction of an image reading apparatus according to this invention.

FIG. 1 illustrates the overall construction of an image reading apparatus. A document such as a book or a file for image reading is placed in an opened state and directed upward on a document platen 1 of the image reading apparatus. The apparatus is provided above the document platen 1 with an image reading unit 2 which includes a linear sensor unit for reading the spread leaf face by means of optical scanning. The base of the document platen 1 for supporting the document is colored to a deeper shade than the color of the background of a standard document. Therefore, the apparatus allows discrimination between the leaf face and the base of the document platen 1 when the document is read against the base as the background. A desired distance intervenes between the document platen 1 and the image reading unit 2. This distance forms a working space.

This apparatus is provided with a lighting unit 3 which is disposed upwardly on the rear side of the document platen 1 and which illuminates the document on the document platen 1; a control panel 4 for setting image reading conditions; a mirror 5, which is positioned at the end of the capturing range on the rear side of the document platen 1 and disposed along the sub-scanning direction and aslant relative to the horizontal plane, for reflecting the shape of the terminal end of a document; and a CPU 23 (FIG. 9) as a control device which controls such capturing operation as a preliminary scanning motion and a main-scanning motion of the image reading unit 2.

The shape of the terminal end of the document reflected in the mirror 5 is read out by the image reading unit 2 and reduced to the leaf face height based on the number of picture elements of the image sensor of the image reading unit 2.

Figure 2:
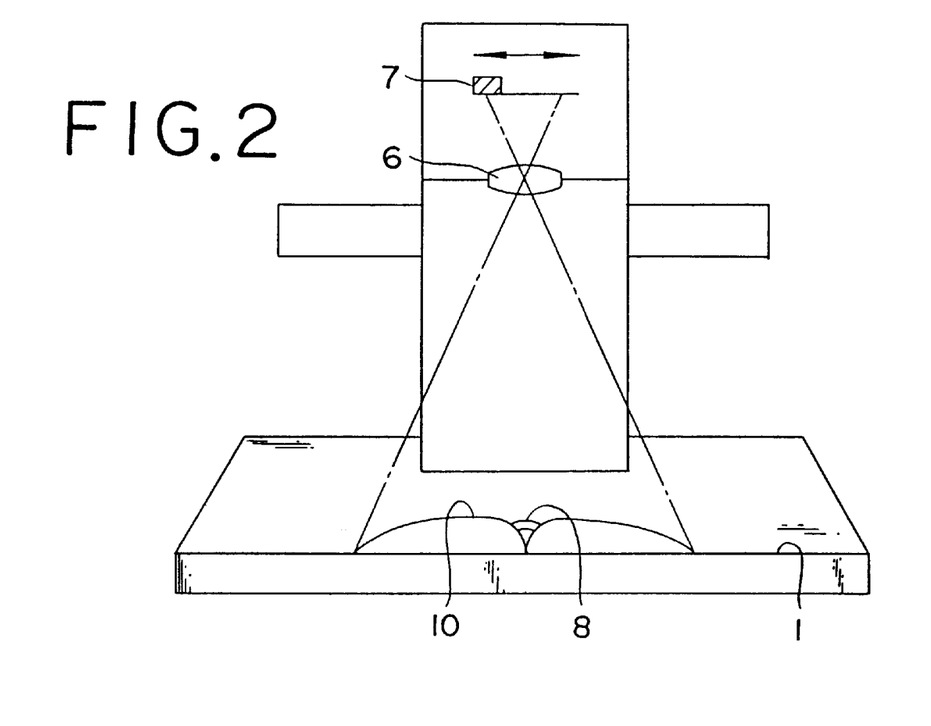
FIG. 2 is a schematic structural diagram illustrating the apparatus as viewed from the front thereof.
Figure 3:
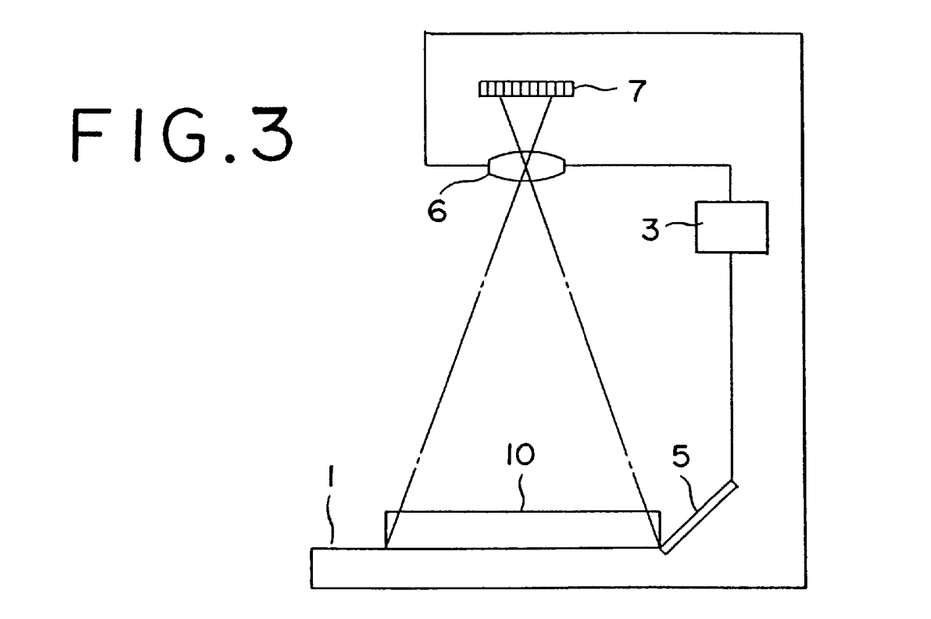
FIG. 3 is a schematic structural diagram illustrating the apparatus as viewed from the lateral side thereof.

FIG. 2 and FIG. 3 illustrate schematic constructions of this apparatus as viewed respectively from the front side and the lateral side.

The image reading unit 2 is provided with a linear sensor unit 7 (ACCD) having a plurality of image sensors arranged linearly in the main-scanning direction, or the direction from the rear side to the foreground side; and an optical system with a lens 6 which projects the image of the leaf face on the linear sensor unit 7 for image capture.

The linear sensor unit 7 reads the image of the leaf face by moving in the sub-scanning direction (the direction of an arrow in FIG. 2) intersecting perpendicularly the main-scanning direction as to the plane on which the image of the leaf face is focused. The lens 6 is disposed so as to be moved in the direction of the optical axis by a lens-driving device not illustrated in the diagram. The lens 6 is moved in conformity with the leaf face height obtained by the operation of height detection to be specifically described herein below, for focusing the image of the leaf face constantly on the linear sensor unit 7.

A document 10 placed on the document platen 1 is bound on one end with an annular binder 8 of metal, for example. In other words, the document 10 is a file or a book in which the binder 8 is at the center and the surfaces of the spread pages are in a bent shape, when opened laterally. The mirror 5, which is positioned on the rear side of the document platen 1 and extended in the sub-scanning direction, also has the function as a stopper for fixing the position of the document. The mirror 5 is disposed as slanted at an angle of 45° relative to the document base of the document platen 1. The position of the document 10 is determined by pressing the upper end of the document 10 against the lower end of the mirror 5 and placing the document 10 so as to align the middle of the document 10 with the center of the document platen 1. Optionally, a standard plate, against which the upper end of the document 10 is pressed, may be installed on the foreground side of the mirror 5.

The terminal end image of the document 10 reflected in the mirror 5 is projected together with the leaf face by the lens 6. Thus, the leaf face of the document 10 placed on the document platen 1 and the terminal end of the document 10 reflected in the mirror 5 are simultaneously read out.

The apparatus, therefore, enjoys simplicity of structure and excellence in operating property. The linear sensor unit 7 is long enough to read out the projected leaf face and the terminal end of the document. Owing to the scanning motion, it reads out simultaneously the leaf face and the terminal end of the document. This example is depicted as a case using the linear image sensor. Optionally, an area image sensor may be used instead.

The leaf face of the document 10 placed on the document platen 1 is generally in a shape physically bent, when opened so that the surfaces of the spread pages are directed upwardly. As a result, it becomes necessary to detect the leaf face height at a varying position in the sub-scanning direction, and correct a distortion of the read image and adjust the focus of the image on the linear sensor unit 7 based on the detected leaf face height.

Figure 4:
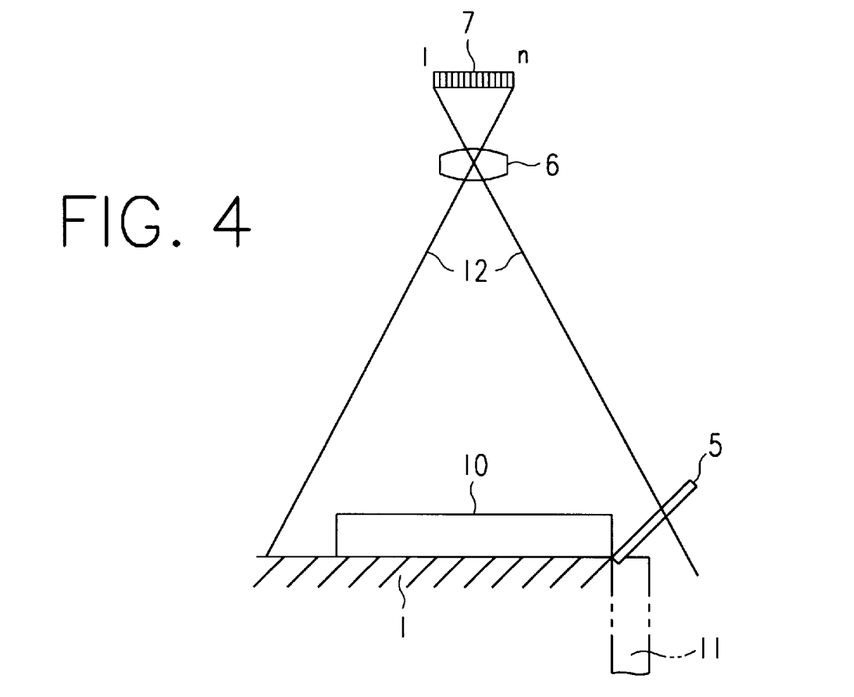
FIG. 4 is a diagram illustrating the principle of the height detection of the leaf face.

FIG. 4 is a diagram illustrating the principle of the height detection of the leaf face. In the height detection of the leaf face, first the document 10 is set in position. The mirror 5 reflects a terminal end image 11 of the document. Next, the linear sensor unit 7 reads out the image 11 in the mirror 5. Then, the distribution of the leaf face height is detected. In FIG. 4, the reading range of the linear sensor unit 7 is indicated by solid line 12 and the image sensor addresses of the linear sensor unit 7 are indicated by "1" to "n" sequentially as reckoned from the left of the face of the paper.

Figure 5:
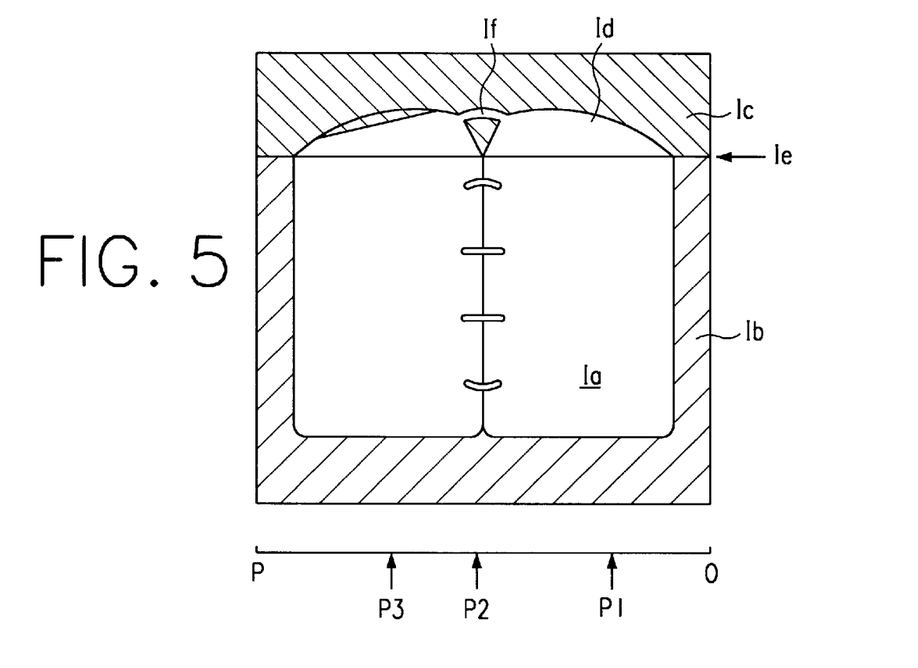
FIG. 5 is a diagram illustrating image data obtained by reading a document bound with binders in the state shown in FIG. 4.

FIG. 5 is a diagram illustrating image data obtained by reading a document 10 bound with binders in the state shown in FIG. 4. In this diagram, the mark Ia represents the image of the leaf face, the mark Ib the image of the document platen 1, the mark Ic the image of the background reflected in the mirror 5, the mark Id the terminal end image of the document reflected in the mirror 5, the mark Ie the base of the document positioning, and the mark If the image of a protrusion of the binders 8. The terminal end image Id of the document is read out such that the high part is slightly bent upward owing to the variation of the leaf face height. The leaf face and the terminal end of the document are generally in a color approximating white. Thus, they are read out white. In contrast, the document platen 1, which is colored in a deeper shade than the background of the document, and the background reflected in the mirror 5 are read out black because of a small amount of reflected light.

Figure 6:
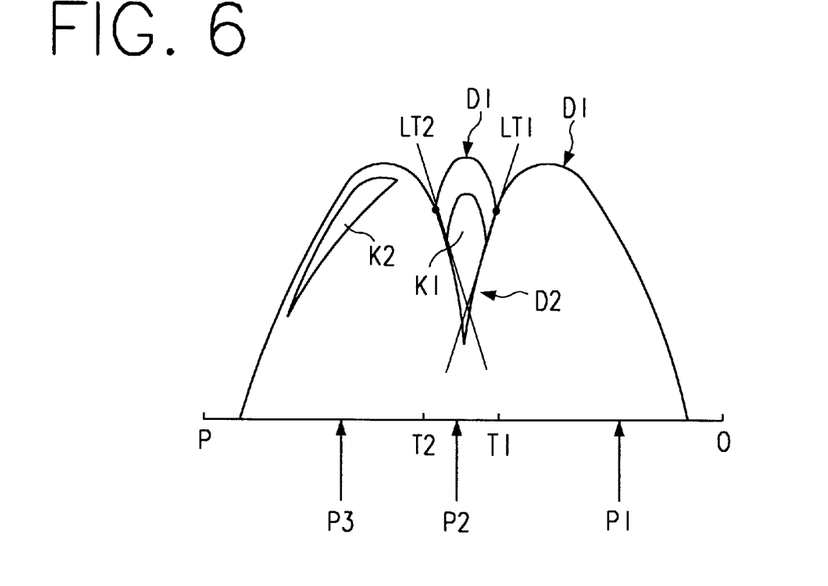
FIG. 6 is a diagram illustrating, as enlarged in the main-scanning direction, the terminal end image of a document, which is over the base for the positioning of the document and reflected in the mirror, according to the image data shown in FIG. 5.

FIG. 6 is a diagram illustrating, as enlarged in the main-scanning direction, only the terminal end image Id of the document which is over the document positioning base Ie and reflected in the mirror 5, according to the image data shown in FIG. 5.

As respects the symbols shown in FIG. 6, the mark D1 represents the lines formed on the leaf face and the upper side of the binders, the mark D2 the leaf face located below the binders, the mark K1 the space formed between the binders and the leaf face, the mark K2 the space formed between the floating upper page and the lower page, marks T1 and T2 the extreme points of the space K1 or the inflection points of the curved line represented by lines D1, and marks LT1, LT2 the tangent lines at the inflection points T1, T2.

Figure 7:
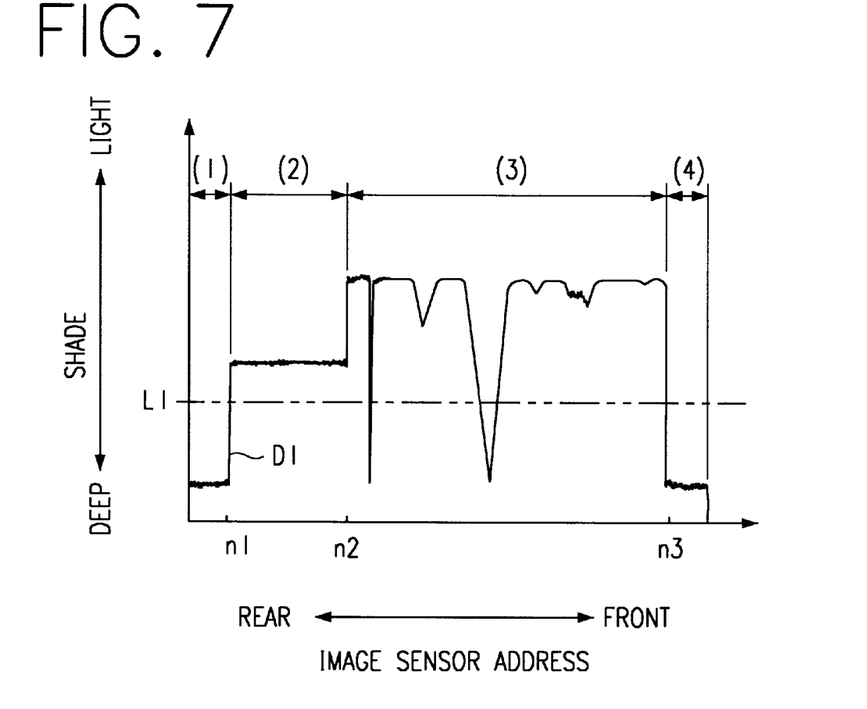
FIG. 7 is a diagram illustrating one line full of the output of the image sensor at the position P1 within the range of the sub-scanning direction O-P of the image data shown in FIG. 5 and FIG. 6.
Figure 8:
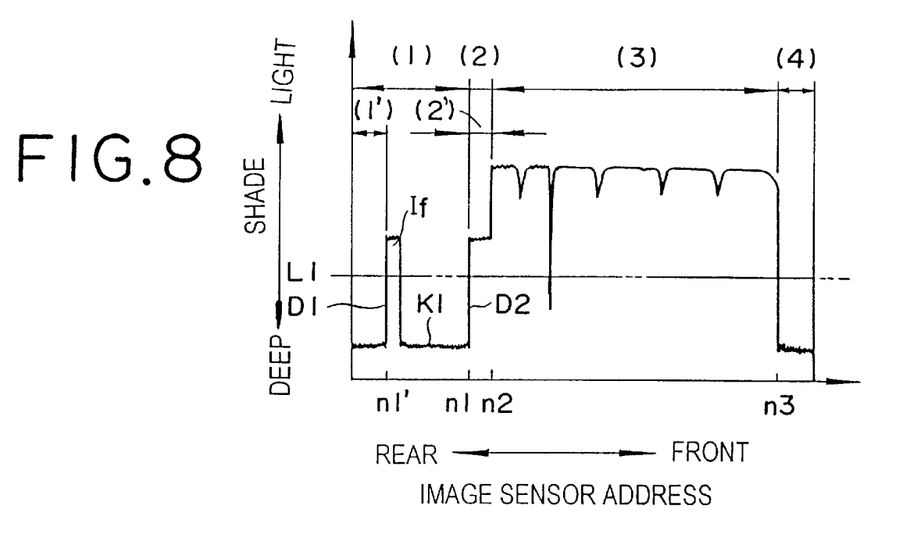
FIG. 8 is a diagram illustrating one line full of the output of the image sensor at the position P2, similar to FIG. 7.

FIG. 7 is a diagram illustrating one full line of the output of the image sensor at the position P1 within the range of the sub-scanning direction O-P of the image data shown in FIGS. 5 and 6. FIG. 8 is a diagram illustrating one full line of the output of the image sensor at the position P2, similar to FIG. 7. In the diagrams, the symbol P1 represents the standard position at which the terminal end of the document is located, and the symbol P2 the position at which the binders are located. In the diagrams, the horizontal axis designates the image sensor addresses of the linear sensor unit 7 and the vertical axis forms the scale of the shade or the outputs of the image sensors.

As illustrated in FIG. 7, the symbol (1) corresponds to the background image Ic reflected in the mirror 5, the symbol (2) to the lateral image or the terminal end image Id reflected in the mirror 5, the symbol (3) the leaf face image Ia, and the symbol (4) the document platen image Ib at the standard position P1 representing the terminal end of the document. In other words, they show the zones of the relevant images on the image sensors.

The symbol L1 represents a desired threshold for discerning between the image of the document and other images, the symbol n1 the image sensor minimum address of the output exceeding the threshold L1, namely the value indicating the position at which the upper edge of the document is in focus as to the terminal end image 11 of the document, the symbol n2 the fixed address of the image sensor corresponding to the document positioning base Ie, and n3 the image sensor maximum address of an output exceeding the threshold L1 at a value exceeding n2, namely the value indicating the position at which the lower edge of the document is in focus as the terminal end image 11 of the document.

The value (n2−n1), therefore, represents the number of picture elements corresponding to the leaf face height to be used in the operation for the height detection. Incidentally, the value (n3−n2−α) represents the number of picture elements corresponding to the size of the document in the longitudinal direction, wherein the value α stands for the curved portion formed in the edge of the document on the foreground side in consequence of a variation in the leaf face height. Further, the value α depends on the leaf face height (n2−n1) in the relevant portion. Therefore, the leaf face height can be detected from the value α. Incidentally, the curved portion corresponding to α is omitted from FIG. 5.

When the linear sensor unit 7 is moved in the lateral direction (the sub-scanning direction), the value n1 varies with the leaf face height at a varying position in the sub-scanning direction. As a result, the distribution of leaf face height in the lateral direction can be obtained. The size of the opened document in the lateral direction can be detected on the grounds that the outputs of the image sensors are wholly lowered.

The diagram of FIG. 8 is identical with that of FIG. 7, excepting that the protrusion If of the output of the image sensor exists in the waveform at the position P2 at which the binders are set. The discernment of the protrusion If enables the detection of the binders and the positions thereof. Specifically, the discernment between the presence and absence of the binders is made based on the detection of the space K1 shown in FIG. 6. Then, the opposite terminal positions T1, T2 of the existing range of the binders are detected based upon the range of the presence of the space K1. In this case, the opposite terminal positions of the range in which the space K1 actually exists may be directly used as the opposite terminal positions T1, T2. The range may be slightly enlarged in consideration of the length corresponding to the thickness of the binders.

Then, the leaf face height is found from the leaf face D2 at the position below the binders, which is one of the terminal points of the space K1 on the document platen side as illustrated in FIG. 6. In this manner, a perfect, accurately focussed image without blurs can be obtained even when characters are written on the leaf face around the binders.

When the protrusion If of the image sensor output is present as illustrated in FIG. 8, the image sensor minimum address of the output exceeding the threshold L1 corresponds to the left end position n1' of the protrusion If. At the position P2 at which the binders are located, however, the leaf face height is detected based on the position n1 illustrated in FIG. 8 and the lens is focussed on the plane of the found height. That is to say, the focal point is set on the leaf face below the binders, or at the terminal point D2 (n1). As a result, the background image Ic reflected in the mirror 5 is discerned not in the zone (1') but in the zone (1) in FIG. 8 and the terminal end image (the lateral image) Id reflected in the mirror 5 is discerned not in the zone (2') but in the zone (2) in FIG. 8.

It is further permissible to erase the image data of the leaf face between the opposite terminal positions T1 and T2. This erasure results in exclusion of the image data of the binders and the shadows thereof, which are unnecessary for an image, thereby producing an image of fine appearance.

Incidentally, a diagram which depicts one line full of the output of the image sensor at the position at which the document is partly in a floating state, or at the position P3 in the range of O–P in the sub-scanning direction of the image data illustrated in FIGS. 5 and 6, resembles that of FIG. 8. Accordingly, a discerning device, which is capable of discerning the center line of the leaf face (the center of the bound part), is provided for the purpose of allowing discernment of these two positions P2, P3. This discerning device discerns the center line of the leaf face based on the median of the scanning range of the linear sensor unit 7, for example. This discernment may be alternatively attained by forming a center line in the mirror 5 for aligning the center of the document 10 in the lateral direction and reading out the center line by means of the linear sensor unit 7. The apparatus judges that the binders are in existence when the space K1 passing the center line of the leaf face is detected by the use of the discerning device.

In contrast, the apparatus judges that the document is partly floating when the space K2 that does not pass the center line of the leaf face is present. At the position P3 at which part of the document is in a floating state, the leaf face height is detected based on the position n1' in FIG. 8 and the lens is focussed on the plane of the detected height. That is to say, the focal point is set in the leaf face D1 (n1'). The background image Ic reflected in the mirror 5, therefore, is discerned not as the zone (1) but as the zone (1') in FIG. 8. The terminal end image (the lateral image) Id reflected in the mirror 5 is discerned not as the zone (2) but as the zone (2') in FIG. 8. In this manner, the discernment between the two positions P2 and P3, is infallibly enabled.

Figure 9:
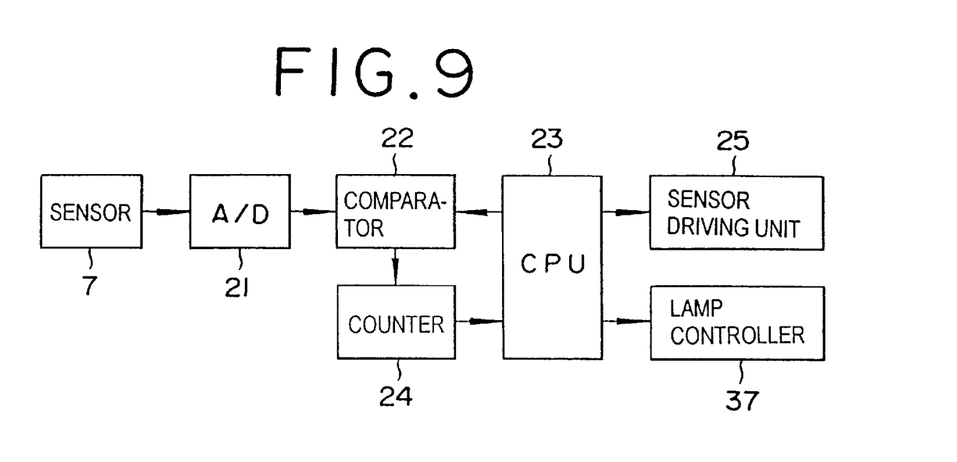
FIG. 9 is a block diagram illustrating a control circuit.

FIG. 9 is a block diagram illustrating a control circuit. In this case, the linear sensor unit 7 executes a preliminary scanning for detecting the leaf face height at a varying position in the sub-scanning direction prior to a main-scanning motion or an actual scanning motion for reading out an image. The outputs (image data) of the linear sensor unit 7 obtained by the preliminary scanning are subjected to A/D conversion by an A/D converter 21 one line at a time sequentially from the image sensor of the address 1 onward. The outcomes of the A/D conversion are inputted into a comparator 22. In the comparator 22, the threshold L1 is set in advance by a CPU 23. When a value over the threshold L1 is inputted into the comparator 22, the value of a counter 24 is stored in a memory not shown in the diagram. The counter 24 takes a count as synchronized with a dot clock which is given to the linear sensor unit 7. The count of the counter 24 indicates the address of the image data to be compared in the comparator 22. The CPU 23 operates on one line at a time to pick up the values n1, n3 and n1' from the counted values stored in the memory, and stores them in the memory. As a result, the leaf face height can be computed by the data conversion and the size of the document in the lateral direction can be found as well.

The image data obtained by the main-scanning operation is subjected to A/D conversion by the A/D converter 21 one line at a time sequentially from the image sensor of the address 1 onward. The image data equivalent to several lines is sequentially written in a writable buffer memory (not shown in the diagram). The CPU 23 outputs a control signal for causing a device to drive the lens (not shown) based on the counter values n1, n3 and n1' while the main-scanning operation is in process. In short, the CPU 23 moves the lens, depending on the reading position of the linear sensor unit 7, so that the image of the leaf face may be formed in a focussed state at all times on the linear sensor unit 7. The CPU 23 also inputs a control signal into a sensor driving unit 25 and a lamp controller 37 for the purpose of controlling the scanning motion of the linear sensor unit 7 and the lamp switch of the lighting unit 3.

Next, the reading motion due to the construction described above will be explained with reference to the flow charts of FIG. 10 and FIG. 11.

Figure 10:
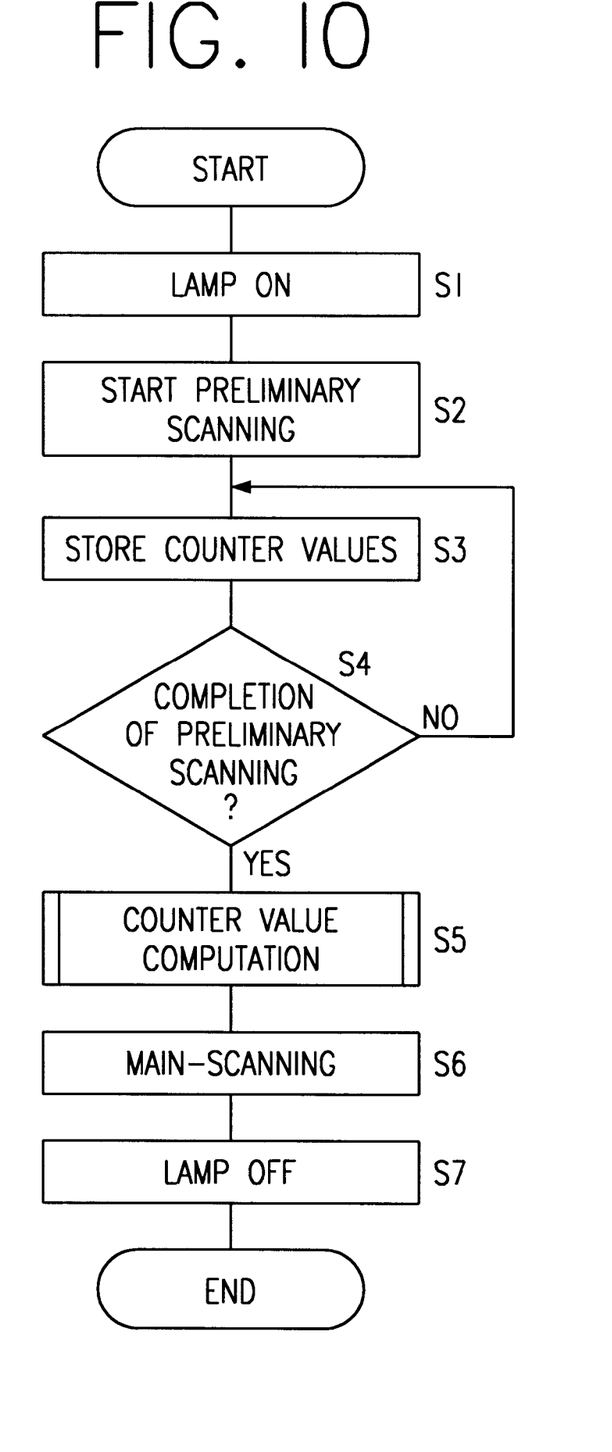
FIG. 10 is a main flow chart illustrating the procedure of a reading operation.
Figure 11:
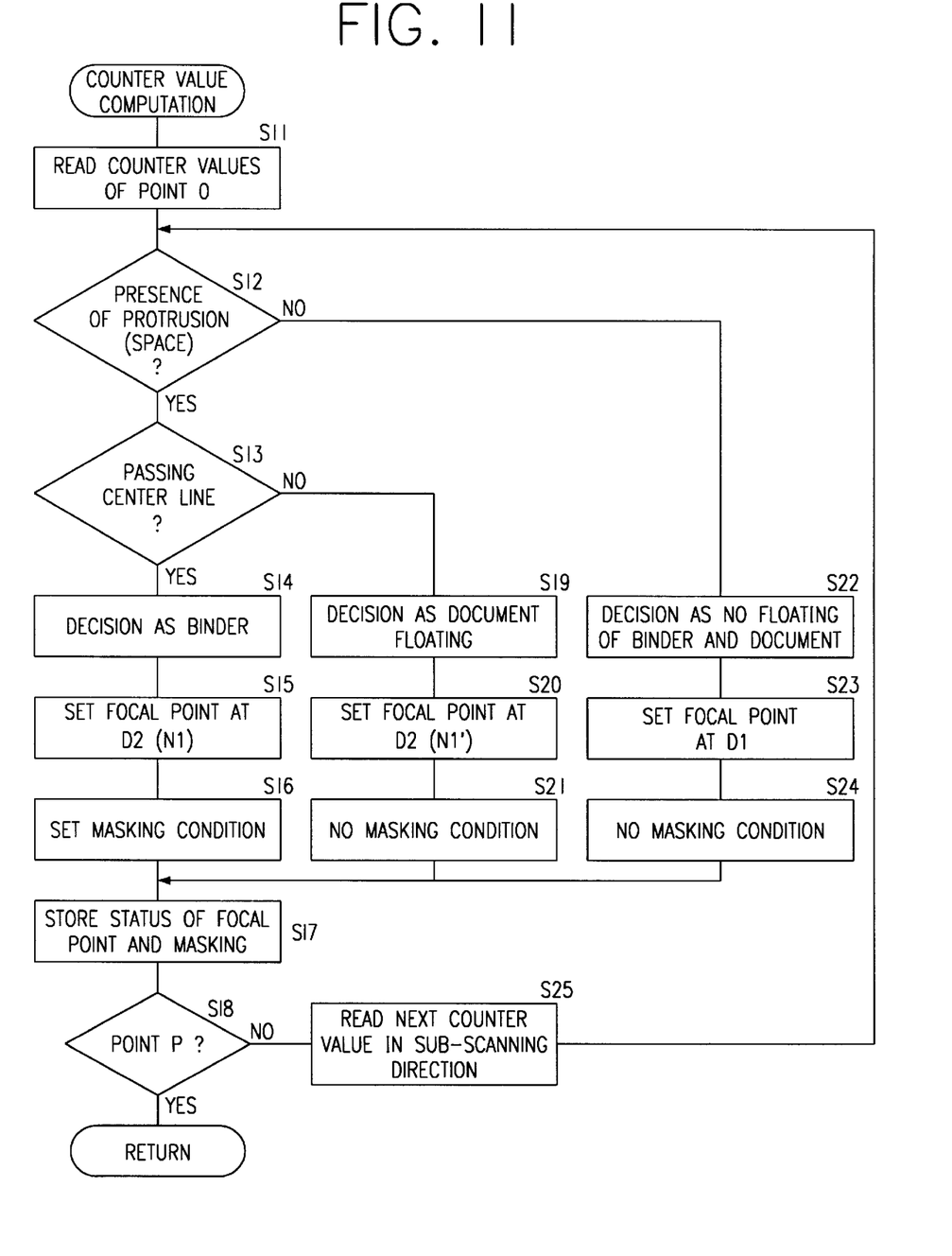
FIG. 11 is a subroutine of the first embodiment for the count computation shown in FIG. 10.

FIG. 10 is a main flow chart depicting the procedure of the reading operation and FIG. 11 is a subroutine of the first embodiment for the counter value computation shown in FIG. 10.

When a start command of the reading motion is inputted from the control panel 4, the CPU 23 switches on the lamp of the illuminating unit 3 for lightening the document 10 (S1) Next, the CPU 23 instructs the sensor driving unit 25 to start a preliminary scanning (S2) and executes the sampling of the counter values n1, n3 and n1' every reading line (S3). Specifically, the operation of the step S3 comprises capturing the images of terminal end and the leaf face of the document reflected in the mirror 5 while moving the linear sensor unit 7 from one end in the sub-scanning direction, and storing the counter values n1, n3 and n1' in the memory. This operation is repeated at a fixed cycle until the preliminary scanning is completed on all the lines (S4). At the time that the preliminary scanning is completed (YES at S4), the counter value computation of deciding the leaf face height and the size of the document is executed based on the sampled counter values (S5).

In the subroutine of the counter value computation (S5) as illustrated in FIG. 11, first the counter values n1, n3 and n1' are read out from the point O shown in FIG. 5 and FIG. 6 (S11). When the protrusion If as shown in FIG. 8 is in existence (YES at S12), the space K1 formed by the protrusion If is examined to judge whether or not this space K1 passes the center line of the leaf face (S13). Specifically, this judgement decides whether or not the position at which the counter value is being read is substantially adjacent to the center line of the leaf face. When the space K1 passes the center line of the leaf face (YES at S13), it is judged that the protrusion If results from the binders 8 (S14). Next, the focal point for focussing is set at D2 (n1) (S15). Then, a masking condition for erasing the leaf face image data within a desired range in the proximity of the space K1 is set (S16).

In contrast, when the space K2 does not pass the center line of the leaf face (NO at S13), it is judged that the protrusion If is caused by the float of the document (S19). Next, the focal point for focussing is set at D2 (n1') (S20). The masking condition for erasing the image data of the leaf face within a desired range in the proximity of the space K2 is not set (S21).

When the protrusion If as shown in FIG. 8 is absent (NO at S12), it is judged that the binders 8 and the float of the document are absent (S22). Next, the focal point for focussing is set at D1 (n1) (S23). The masking condition for erasing the image data of the leaf face within a desired range in the proximity of the space is not set (S24).

Next, the information as to the presence or absence of the setting of the focal point and the masking condition is inputted into the memory (S17). When the position, at which the counter values are currently read out, is not the point P shown in FIGS. 5 and 6 (NO at S18), the reading of the counter values are done at the next position in the sub-scanning direction (S25). When the above operation is repeated and the reading of the counter values at the point P and the computation are completed (YES at S18), the operational flow is returned to the main flow chart shown in FIG. 10.

Next, the instruction to start the main-scanning causes the sensor driving unit 25 to move the linear sensor unit 7 in the direction opposite that of the preliminary scanning and do the main-scanning for capturing the image of the document 10 (S6). While the main-scanning motion is in process, the CPU 23 inputs the control signal into the lens driving device based on the data of the leaf face height obtained by the counter value computation at S5 and adjusts the focus of the lens 6. Incidentally, the CPU 23 stops reading the image data, or erases the image data, in the masking set area. When the main-scanning operation is completed on all the lines, the lamp is turned off (S7) and the image reading operation is completed.

As described above, the present image reading apparatus can infallibly judge the fact that such objects as binders, which are unnecessary for reading, exist in a given document for reading. The apparatus calculates the leaf face height on the basis of the leaf face D2 under the binders which is the terminal point of the space K1 on the document platen side. Therefore, the possibility of the focussing operation being disrupted is nil even when characters are written on the leaf face around the binders. It is possible to obtain a perfect image without blurs. Incidentally, in this case, the masking (S16 of FIG. 11) is not carried out. Meanwhile, when the leaf face image data between the opposite terminal positions T1, T2 of the space K1 is erased, the image data of the binders themselves and the shadows thereof, which are unnecessary for an image, are excluded. An image of a fine appearance can be thus captured.

As concrete examples of the binders, annular binders made of a resin, binders consisting of two or more bars, a binder that helically binds outer sides of a document, and a binder consisting of a cord are conceived besides the binders contemplated in the present embodiment. In any case, the bound part is located at the center of the leaf face and an empty space or a gap intervenes between the bound part and the document. In these cases, therefore, the distance measuring plate is utilized for detecting the continuous edge line in the upper end and the binding part (the intersection point to the center of the edge line). Then, the shorter of the continuous edge lines is detected as the binders and the detected part is erased.

Second Embodiment

The first embodiment has a possibility that the space K1 as shown in FIG. 6 is collapsed to the extent of escaping recognition. The second embodiment is so designed to discern the presence of such objects as binders, which are unnecessary for the image reading, even when the space K1 is in such a state.

The apparatus takes sole notice of the lines D1 in the second embodiment, which are formed on the upper sides of the leaf face and the binders as shown in FIG. 6. Two inflection points never fail to appear when the document is bound with binders, for example. In other words, it is judged that such objects as binders 8 are in existence when two or more inflection points are present. Incidentally, the opposite terminal positions T1 and T2 between which the binders are present are determined based on the two outermost inflection points. The zone intervening between these opposite terminal positions T1 and T2 is subjected to the masking. The inflection points can be determined, for example, as the extreme values of the graph of the line D1. The thought for the case of involving two or more inflection points consists in taking into account such inflection points caused by the bound part of the binder 8.

As respects the zone between the opposite terminal positions T1 and T2, the focussing is effected by determining approximately the leaf face height, based on the tangents LT1 and LT2 at the two outermost inflection points on the graph of the lines D1 formed the upper side of the leaf face and the binders, in accordance with the image data corresponding to the leaf face height as illustrated in FIG. 6. In any other zone, the lens is focussed on the leaf face D1. Incidentally, no inflection point appears in the space K2 arising from the float of the document. As a result, the process for discriminating the space K2 from the space K1 arising from the binders 8, for example, does not need to be particularly carried out.

Figure 12:
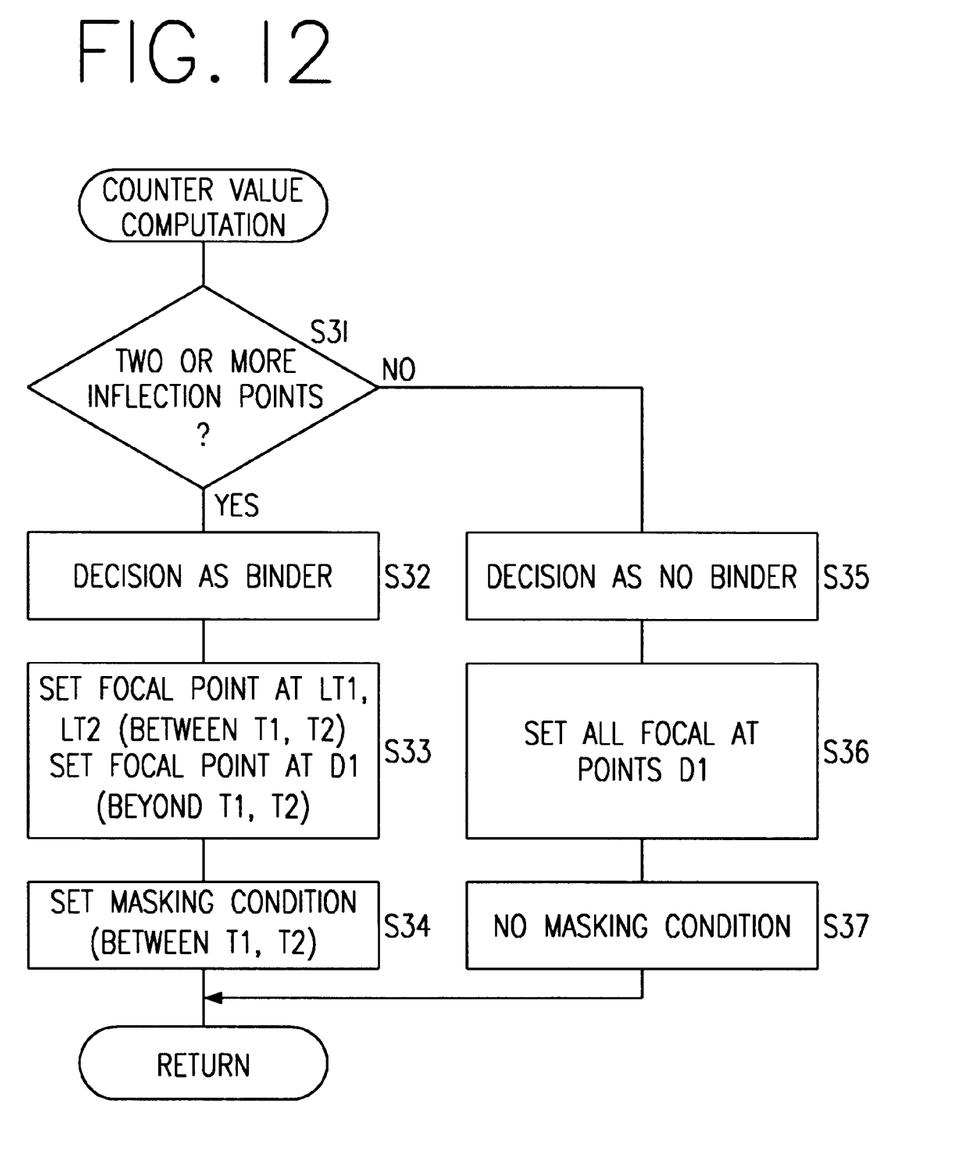
FIG. 12 is a subroutine of the second embodiment for the count computation shown in FIG. 10.

FIG. 12 is a subroutine of the second embodiment for the counter value computation shown in FIG. 10. The main flow chart and the mechanical structure of the second embodiment are identical with those of the first embodiment and, therefore, will be omitted from the following description.

In the second embodiment, it is first judged whether or not the lines D1 formed on the upper side of the leaf face and the binders contains two or more inflection points (S31) as illustrated in FIG. 12. When two or more inflection points exist, it is judged that the binders are present (S32). Then, the focal point for focussing is set at the tangents LT1, LT2 in the zone between the opposite terminal positions T1 and T2, and at the line D1 in zones outside the zone between the opposite terminal positions T1 and T2 (S33). Next, the masking condition for erasing the leaf face image data in the zone between the opposite terminal positions T1 and T2 is set (S34).

When one or no inflection point is in existence (S31), it is judged that the binders are absent (S35). Next, the focal points for focussing are wholly set on the line D1 (S36). The masking for erasing the image data is not carried out (S37).

The apparatus in the second embodiment, thus, can manifest the same effect as the apparatus in the first embodiment. Further, the apparatus can discern the presence of such objects as binders, which are unnecessary for reading, simply by analyzing the detected data of the leaf face height even when the space K1 escapes recognition. The apparatus in the second embodiment, therefore, does not always require the reading of the terminal end of the document.

It is obvious that this invention is not limited to the particular embodiments shown and described above but may be variously changed and modified without departing from the technical concept of this invention.

The apparatus in the embodiments detects the leaf face height by reading the terminal end image reflected in the mirror 5 with the linear sensor unit 7. It may be applied effectively for the device which is provided with an exclusive linear sensor unit for directly reading the terminal end image without using a mirror. It may be applied further for an image reading apparatus which utilizes another method of detecting the leaf face height different from the method according to the present example for focussing a lens during the image capture.

Incidentally, annular binders of resin, linear binders of metal and a binder consisting of a cord are conceived as concrete examples of the binders besides the half-round binders of metal mentioned in the embodiments. In any case, the bound part is located at the center of the leaf face and an empty space is formed between the binder and the leaf face. Therefore, the invention is effective in these various cases.

The entire disclosure of Japanese Patent Application No. 09-000317 filed on Jan. 6, 1997, including the specification, claims, drawings and summary are incorporated herein by reference in its entirety.

What is claimed is:

1. An image reading apparatus comprising:
   a reading unit for reading a side shape of a document placed on a document platen and a document surface of said document and for outputting image data; and
   an unnecessary object detector for detecting an unnecessary object relative to said document surface, based on whether said image data, outputted by said reading unit, includes image data representative of a space between said document surface and an object other than said document surface, and based on a position of said space.

2. An image reading apparatus according to claim 1, wherein said unnecessary object detector discerns a presence of said unnecessary object when said space between said document surface and said object other than said document surface is in existence.

3. An image reading apparatus according to claim 1, wherein said object other than said document surface is a binder.

4. An image reading apparatus according to claim 1, further comprising a mirror for reflecting said side shape of said document toward said reading unit, wherein said reading unit can simultaneously read said document surface and said document side shape reflected in said mirror when said document is placed on said platen.

5. An image reading apparatus according to claim 1, wherein said document surface is a spread leaf face of said document, further comprising a discerning device for discerning a center line of said spread leaf face of said document, when said document is placed on said document platen in a spread condition.

6. An image reading apparatus according to claim 5, wherein said unnecessary object detector discerns that said unnecessary object is present when said space between said document surface and said object other than said document surface exists in a proximity of said center line discerned by said discerning device as to said image data outputted by said reading unit.

7. An image reading apparatus according to claim 6, further comprising an erasing unit for removing, from image data outputted by said reading unit, image data corresponding to a desired zone in said proximity of said center line discerned by said discerning device when said presence of said unnecessary object is discerned.

8. An image reading apparatus according to claim 1, wherein said document surface is a spread leaf face of said document and said unnecessary object is detected when said space passes a center line of said spread leaf face.

9. An image reading apparatus comprising:
 a reading unit for reading a document surface of a document placed on a document platen, and for outputting image data;
 a detector for detecting a height distribution of said document surface; and
 a decision unit for deciding an unnecessary object for reading is present when said height distribution detected by said detector contains at least two intersection points of curved lines.

10. An image reading apparatus according to claim 9, wherein said unnecessary object is a binder.

11. An image reading apparatus according to claim 9, further comprising a mirror for reflecting a side shape of said document toward said reading unit, wherein said reading unit can simultaneously read said document surface of said document and said document side shape- reflected in said mirror for detecting said height distribution of said document surface when said document is placed on said document platen.

12. An image reading apparatus according to claim 9, further comprising an erasing unit for removing from image data outputted by said reading unit image data located between said intersection points when said decision unit decides said unnecessary object is present.

13. An image reading apparatus, according to claim 9 wherein, when said decision unit decides said unnecessary object is present, height distribution data corresponding to a zone in which said unnecessary object exists are replaced with data of tangent lines at said intersection points of curved lines.

14. An image reading apparatus according to claim 9, wherein said decision unit decides said unnecessary object is present when said height distribution detected by said detector contains two intersection points of curved lines in a proximity of a corresponding center line of said document surface.

15. An image reading apparatus for reading a document of a plurality of sheets bundled with binders passed through punched holes formed in said plurality of sheets, said binders extending above a surface of said document creating a space therebetween, said apparatus comprising:
 a reading unit for reading said document surface, and for outputting image data;
 a binder detector for detecting positions of said binders extending above said document surface in said document; and
 an erasing unit for removing from image data, outputted by said reading unit, image data corresponding to said binders extending above said document surface.

16. An image reading apparatus according to claim 15, wherein said binder detector includes a discerning device for discerning a document side shape substantially perpendicular to said document surface of said document and parallel to a direction in which said document is spread, said binder detector detecting said positions of said binders extending above said document surface based on said document side shape.

17. An image reading apparatus according to claim 16, further comprising a mirror for reflecting said document side shape of said document toward said reading unit, wherein said discerning device discerns said document side shape of said document corresponding to side shape image data outputted from said reading unit.

18. An image reading apparatus for reading a document placed on a document platen, said document having a document face and an end, said apparatus comprising:
 a reading unit for reading a shape of the end of the document placed on the document platen and for outputting end shape image data representative of thus read end shape;
 a detector for identifying data representative of a closed space in said end shape image data outputted by said reading unit; and
 image data processing means for processing data based on whether said detector identifies said closed space.

19. An image reading apparatus according to claim 18, further comprising a face reading means for reading said document face and for outputting face image data representative of thus read document face, wherein data processed by said image data processing means is said face image data.

20. An image reading apparatus according to claim 18, wherein said detector detects said closed space in said end shape image data in a corresponding proximity of a center in a lateral direction of said end shape of said document as an unnecessary object.

21. An image reading apparatus according to claim 18, wherein said document surface is a spread leaf face of said document and predetermined image processing is executed when said closed space passes a center line of said spread leaf face.

22. An image reading apparatus comprising:

a reading unit for reading a side shape of a document placed on a document platen and a document surface of said document and for outputting image data;

a discerning device for discerning a center line of said document, when said document is placed on said document platen; and an unnecessary object detector for detecting an unnecessary object based on whether said image data, outputted by said reading unit, includes image data representative of a space between said document surface and an object other than said document surface in a proximity of said center line discerned by said discerning device.

23. An image reading apparatus according to claim 22, further comprising an erasing unit for removing, from image data outputted by said reading unit, image data corresponding to a desired zone in said proximity of said center line when said presence of said unnecessary object is discerned.

* * * * *